United States Patent [19]

Borsai

[11] Patent Number: 5,489,147
[45] Date of Patent: Feb. 6, 1996

[54] HUB FOR SPOKED WHEEL AXLE

[76] Inventor: Laszlo G. Borsai, 2235 S. Loara St., Anaheim, Calif. 92802

[21] Appl. No.: 381,552

[22] Filed: Jan. 31, 1995

Related U.S. Application Data

[63] Continuation-in-part of Ser. No. 176,762, Dec. 30, 1993, abandoned.

[51] Int. Cl.$^6$ .................................................. B60B 1/14
[52] U.S. Cl. .................................... 301/59; 301/56
[58] Field of Search .................................. 301/55, 56, 59, 301/61, 104, 110.5

[56] References Cited

U.S. PATENT DOCUMENTS

| 665,911 | 1/1901 | Jackson | 301/59 |
|---|---|---|---|
| 1,333,019 | 3/1920 | Graham | 301/59 |
| 1,477,369 | 12/1923 | Kowalsky | 301/56 |
| 2,702,725 | 2/1955 | Lyman | 301/59 |
| 4,300,804 | 11/1981 | Hasebe | 301/56 X |
| 5,429,421 | 2/1995 | Watson | 301/59 X |

FOREIGN PATENT DOCUMENTS

| 371295 | 1/1907 | France | 301/59 |
|---|---|---|---|
| 1150994 | 1/1958 | France | 301/59 |
| 2007 | of 1908 | United Kingdom | 301/59 |
| 17142 | of 1910 | United Kingdom | 301/110.5 |
| 338561 | 11/1930 | United Kingdom | 301/59 |

*Primary Examiner*—Russell D. Stormer
*Attorney, Agent, or Firm*—Klein & Szekeres

[57] ABSTRACT

A hub for a spoked wheel includes an annular peripheral portion having an outer surface, an inner surface, and a peripheral edge, wherein the inner surface and the outer surface define non-parallel planes, and wherein the inner surface forms an acute angle with respect to the rotational axis defined by the hub, whereby the peripheral portion is thickest along the peripheral edge, and tapers to a reduced thickness at a constant radius from the peripheral edge. First and second pluralities of spoke attachment apertures extend through the outer and inner surfaces, the first plurality of spoke attachment apertures providing attachment points for a plurality of outer spokes on the outer surface and the second plurality of spoke attachment apertures providing attachment points for a plurality of inner spokes on the inner surface. First and second pluralities of grooves on the outer and inner surfaces, respectively, are each dimensioned to receive and engage a portion of the length of one of the spokes adjacent its associated attachment point so as to substantially reduce the pivoting of the spoke around its associated attachment point in response to a torque applied to the spoke.

6 Claims, 1 Drawing Sheet

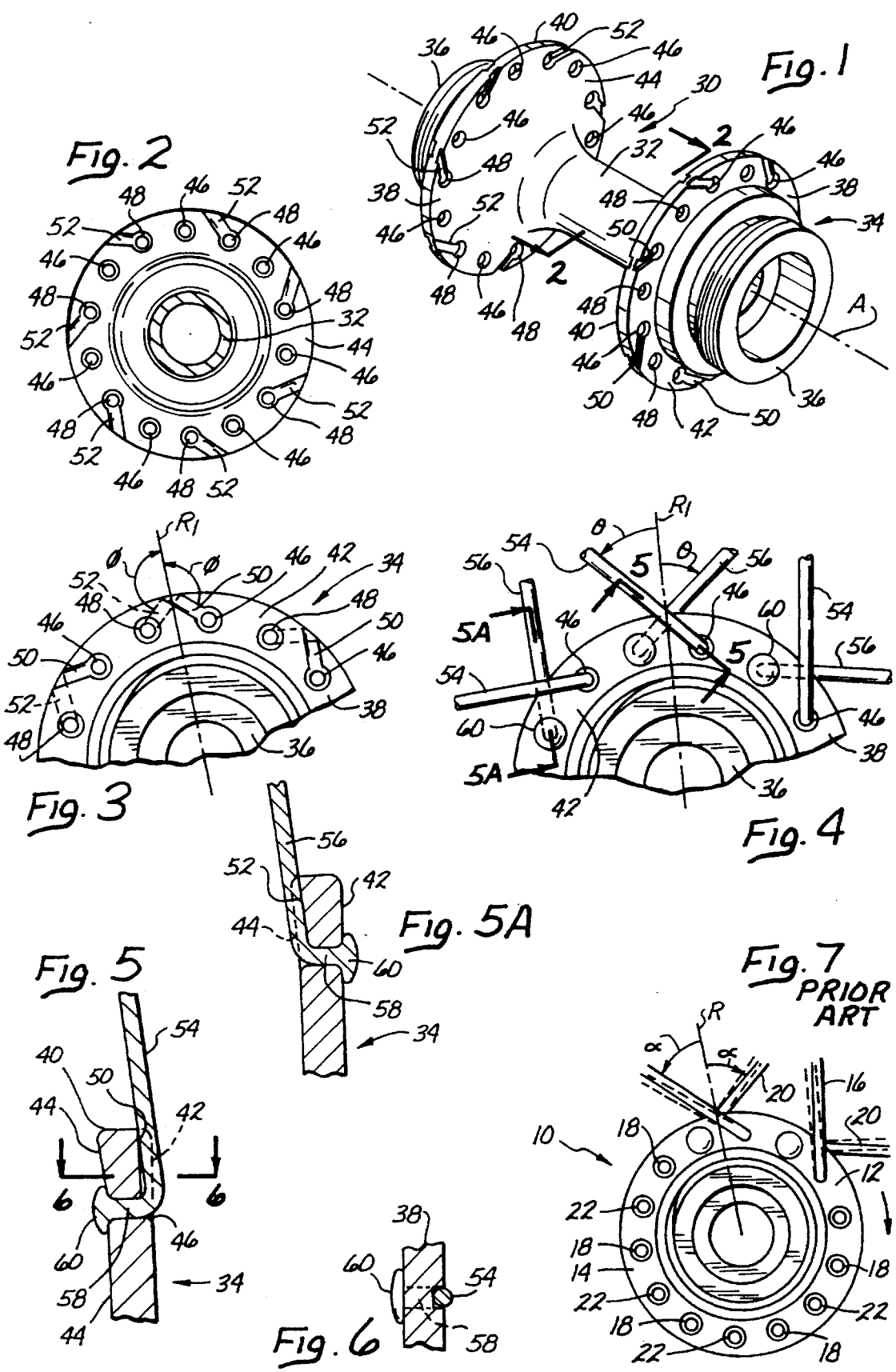

HUB FOR SPOKED WHEEL AXLE

CROSS REFERENCE TO RELATED APPLICATION

This application is a Continuation-In-Part of application Ser. No. 08/176,762, filed Dec. 30, 1993, now abandoned.

BACKGROUND OF THE INVENTION

This invention relates generally to the field of vehicle wheel structures. More specifically, the invention relates to an improved hub for the axle of a spoked wheel for a bicycle, motorcycle, or the like, wherein the improvement provides for a more efficient application of torque between the hub and the spokes, and thus a more efficient transfer of rotation-inducing power from the axle to the rim through the hub and the spokes.

The typical prior art spoked wheel for a bicycle, for example, includes a cylindrical axle with a circular hub at both ends. As shown in FIG. 7, each hub 10 has an annular peripheral portion 12 with an outer surface 14 and an inner surface (not shown). A first plurality of spokes 16 is attached to the outer surface 14 of the peripheral portion 12 at a first plurality of equidistantly-spaced attachment apertures 18, each spoke 16 in the first plurality of spokes forming an equal angle $\alpha$ with respect to a radius R of the hub that passes through a point on the peripheral edge of the hub directly underlying the spoke 16. A second plurality of spokes 20 is attached to the inner surface of the peripheral portion 12 at a second plurality of equidistantly-spaced attachment apertures 22, each spoke 20 in the second plurality of spokes forming an equal angle $-\alpha$ with respect to the radius R of the hub. The angle $-\alpha$ is equal in magnitude to the angle $\alpha$ of the first plurality of spokes, but oppositely directed, so that the spokes of the first and second pluralities cross over each other and the radius R near the periphery of the hub at an angle having a magnitude of $2\alpha$.

One drawback to the above-described arrangement is that the torque applied to the spokes by the rotation of the wheel tends to cause the spokes to pivot around their attachment points on the hub, so as to displace the spokes from their nominal angular orientations, as shown by the broken outlines in FIG. 7. One consequence of such pivoting and angular displacement of the spokes is a loss of rotation-inducing power transfer between the hub and the rim. Another consequence is the gradual weakening of the spokes due to the stresses and strains of the pivoting and displacement.

Accordingly, there has been a long-felt need for a simple, cost effective mechanism for substantially reducing the above-described pivoting and displacement of the spokes.

SUMMARY OF THE INVENTION

Broadly, the present invention is a hub for a spoked wheel, wherein the hub is substantially circular with an annular peripheral portion having an outer surface, an inner surface, and a peripheral edge, wherein the inner surface and the outer surface define non-parallel planes, and wherein the inner surface defines an acute angle with respect to the rotational axis defined by the hub. The peripheral portion is thus thickest along the peripheral edge, and tapers to a reduced thickness at a constant radius from the peripheral edge. First and second pluralities of spoke attachment apertures extend through the outer and inner surfaces, and first and second spoke restraining means are provided on the outer and inner surfaces, respectively, for engaging a portion of the length of a spoke attached to the hub at an associated aperture so as to substantially reduce the pivoting of the spoke around its associated attachment aperture in response to the torque applied to the spoke by the rotation of the wheel.

More specifically, in a preferred embodiment of the invention, the first spoke restraining means comprises a first plurality of outer grooves in the outer surface of the peripheral hub portion, and the second spoke restraining means comprises a second plurality of inner grooves in the inner surface of the peripheral hub portion. Each of the outer grooves extends from one of the first plurality of spoke attachment apertures to a first termination point on the outer surface of the peripheral portion of the hub at the peripheral edge thereof. Each of the inner grooves extends from one of the second plurality of apertures to a second termination point on the inner surface of the peripheral portion of the hub at the peripheral edge thereof, the first and second termination points being on the same radius $R_1$ of the hub. Each of the outer grooves thus forms an obtuse angle $\phi$ with respect to the radius $R_1$, while each of the inner grooves forms an equal but oppositely-directed obtuse angle $-\phi$ with respect to the radius $R_1$.

The placement of each spoke in an associated groove substantially restrains the spoke from rotational movement or pivoting around its attachment point at its associated aperture, thereby substantially eliminating, or at least minimizing the angular displacement of the spokes from their nominal angular orientations. This is accomplished without significantly increasing the cost or complexity of the hub/axle unit, and without measurably compromising its structural integrity, durability, or strength.

BRIEF DESCRIPTION OF THE DRAWINGS

FIG. 1 is a perspective view of a hubbed axle unit, for a spoked wheel, in accordance with a preferred embodiment of the present invention;

FIG. 2 is a cross-sectional view taken along line 2—2 of FIG. 1;

FIG. 3 is a fragmentary end elevational view of the hubbed axle of FIG. 1;

FIG. 4 is a view similar to that of FIG. 3, showing the attachment of spokes to the hub portion of the hubbed axle of FIG. 1;

FIG. 5 is a cross-sectional view taken along line 5—5 of FIG. 4;

FIG. 5A is a cross-sectional view taken along line 5A—5A of FIG. 4;

FIG. 6 is a cross-sectional view taken along line 6—6 of FIG. 5; and

FIG. 7 is a semi-diagramatic end elevational view of a prior art hub, showing the angular displacement of the spokes in response to rotational forces.

DETAILED DESCRIPTION OF THE PREFERRED EMBODIMENT

Referring first to FIGS. 1, 2, and 3, a hubbed axle unit 30, in accordance with a preferred embodiment of the present invention, is shown. The unit 30 is for a spoked vehicle wheel (not shown), of the type commonly used on bicycles and motorcycles. Preferably, the unit 30 is formed of an integral piece of suitable metal, and it comprises a cylindrical axle portion 32, having a longitudinal rotational axis A, with a substantially circular hub portion 34 at each end, the rotational axis A being substantially orthogonal to the radii of the hub portions 34. Alternatively, the axle portion and the hub portions may be separately formed, and attached to each other by means such as welding.

Each of the hub portions 34 includes a central portion 36 adapted for attachment to the frame (not shown) of the vehicle (not shown). Coaxially surrounding the central portion 36 is an annular peripheral portion 38, the latter having a peripheral edge 40, an outer surface 42, and an inner surface 44. As shown in FIGS. 5 and 5A, the outer surface 42 of the peripheral portion 38 and the inner surface 44 of the peripheral portion 38 define non-parallel planes. Specifically, the outer surface 42 is substantially perpendicular to the rotational axis A, while the inner surface 44 forms an acute angle with respect to the rotational axis A. Thus, the peripheral portion 38 of the hub is thickest along the peripheral edge 40, and tapers to a lesser thickness at a constant radial distance from the peripheral edge 40. The purpose of the angled configuration of the inner surface 44 will be explained below.

A first plurality of spoke attachment apertures 46 is provided in the peripheral portion 38, the apertures 46 in the first plurality being equidistantly spaced from each other. A second plurality of spoke attachment apertures 48 is provided in the peripheral portion 38, the apertures 48 in the second plurality being equidistantly spaced from each other. Preferably, all of the apertures 46, 48 in both the first and second pluralities are equidistantly spaced around the peripheral portion 38, so that the apertures may be viewed as forming a single plurality.

A first plurality of outer grooves 50 is formed in the outer surface 42 of the peripheral portion 38, and a second plurality of inner grooves 52 is formed in the inner surface 44 of the peripheral portion 38. Each of the outer grooves 50 extends from one of the apertures 46 in the first plurality of apertures, and each of the inner grooves 52 extends from one of the apertures 48 in the second plurality of apertures. (If all the apertures are considered as forming a single plurality, the outer grooves 50 and the inner grooves 52 extend from alternating apertures.)

As best shown in FIG. 3, each of the outer grooves 50 extends from one of the apertures 46 in the first plurality of apertures to a first termination point on the outer surface 42 of the peripheral portion 38 of the hub at the peripheral edge 40 thereof. Each of the inner grooves 52 extends from one of the apertures 48 in the second plurality of apertures to a second termination point on the inner surface 44 of the peripheral portion 38 of the hub at the peripheral edge 40 thereof, the first and second termination points being on a single radius $R_1$ of the hub. Each of the outer grooves 50 thus forms an obtuse angle $\phi$ with respect to the radius $R_1$, while each of the inner grooves 52 forms an equal but oppositely-directed obtuse angle $-\phi$ with respect to the radius $R_1$. The absolute value of $\phi$ is typically about 135°, but it may vary substantially from this value.

Referring now to FIGS. 4, 5, 5A, and 6, a first plurality of outer spokes 54 and a second plurality of inner spokes 56 are shown attached to the hub portion 34 at the first and second plurality of apertures 46, 48, respectively. The outer spokes 54 are seated in the outer grooves 50, and form an acute angle $\theta$ with respect to the radius $R_1$, while the inner spokes 56 are seated in the inner grooves 52 and form an equal but oppositely-directed acute angle $-\theta$ with respect to the radius $R_1$. The spoke angles $\theta$ and $-\theta$ are supplementary to the groove angles $\phi$ and $-\phi$, respectively.

The spokes 54, 56 each have an end portion 58 that is bent to enter and pass through its associated aperture, with the spoke being fixed to the hub portion by a flattened head 60 that seats snugly against the adjacent surface of the peripheral portion 38 of the hub portion 34. Specifically, the heads 60 of the outer spokes 54 seat against the outer surface 42, and the heads 60 of the inner spokes 60 seat against the inner surface 44, of the peripheral portion 38.

As best shown in FIG. 6, the grooves 50, 52 are of a substantially uniform width that is just slightly larger than the outside diameter of the spokes 54, 56, so that the spokes seat snugly in their respective grooves 50, 52, with little or no "play" between the spokes and the interior surface of the grooves. Preferably, the interior surface of each groove engages the spoke contained therein, so that the spoke is effectively locked in place, with no significant freedom of movement. The grooves 50, 52 are preferably deep enough to encompass and engage at least about half the outside circumference of the spokes 54, 56, thereby enhancing the locking function. This structure requires the peripheral portion 38 of the hub portion 34 to be of sufficient thickness to accommodate grooves of the required depth, without compromising the strength or structural integrity of the hub portion.

Because the hubs 34 extend beyond the plane defined by the rim (not shown) of the wheel, the spokes 54, 56 are angled inwardly, toward the center of the axle portion 32, as they extend from the hubs 34 to the rim, as shown in FIGS. 5 and 5A. Because of their inwardly-angled orientation, the outer spokes 54 are urged, by their own geometry, tightly against the outer surface 42, and thus into the outer grooves 50 (FIG. 5). The tendency of the inner spokes 56, on the other hand, is to be urged, by virtue of their angled orientation, away from the inner surface 44, and thus out of the inner grooves 52. To counteract this tendency, the inner surface 44 is inwardly angled, as mentioned above, and as best shown in FIG. 5A, at an angle that is more acute (with respect to the longitudinal rotational axis A) than the angle of the inner spokes 56, so that the inner spokes 56 are urged toward the inner surface 44 and into the inner grooves 52.

Although the preferred embodiment shown in the drawings has grooves 50, 52 that are flat-bottomed, with perpendicular side walls, other groove configurations may provide suitable results. For example, the grooves may be notched or "V"-shaped, or semicircular or trapezoidal in cross-section.

The spokes 54, 56, being snugly seated in the grooves 50, 52, are substantially restrained from rotational movement or pivoting around their attachment points at their associated spoke attachment apertures 46, 48, thereby substantially eliminating, or at least minimizing, the angular displacement of the spokes from their nominal angular orientations with respect to the hub radius. With the angular motion of the spokes drastically reduced, if not eliminated, rotation-inducing power transfer from the hub to the rim of the wheel is optimized. Furthermore, the stresses and strains on the spokes resulting from angular motion are minimized, thereby reducing the chance of premature spoke wear and failure. Moreover, these advantages are achieved without compromising the structural strength or integrity of the hub/axle unit, and without significantly increasing the complexity of the unit, or its cost of manufacture.

Although a preferred embodiment of the invention is described herein, a number of variations and modifications will suggest themselves to those skilled in the pertinent arts. For example, as mentioned above, the grooves 50, 52 may be made in a number of cross-sectional configurations, and the angle α may be within a range around 45°. Furthermore, it will be appreciated that the present invention may be adapted for spoked wheels of a large variety of types, sizes, and applications, including wheels for bicycles, motorcycles, and even automobiles, with spokes of various sizes and materials. Such modifications and variations are within the spirit and scope of the invention, as defined in the claims that follow.

What is claimed:

1. A hub for a spoked wheel, wherein the hub defines a rotational axis for the wheel, comprising:

an annular peripheral portion having an outer surface, an inner surface, and a peripheral edge, wherein the inner surface and the outer surface define non-parallel planes, and wherein the inner surface forms an acute angle with respect to the rotational axis, whereby the peripheral portion is thickest along the peripheral edge, and tapers to a reduced thickness at a constant radius from the peripheral edge;

first and second pluralities of spoke attachment apertures extending through the outer and inner surfaces, the first plurality of spoke attachment apertures providing attachment points for a plurality of outer spokes on the outer surface and the second plurality of spoke attachment apertures providing attachment points for a plurality of inner spokes on the inner surface;

a plurality of outer grooves on the outer surface, each dimensioned to receive and engage a portion of the length of one of the outer spokes adjacent its associated attachment point so as to substantially reduce the pivoting of each of the outer spokes around its associated attachment point in response to a torque applied to the outer spoke; and a plurality of inner grooves on the inner surface, each dimensioned to receive and engage a portion of the length of one of the inner spokes adjacent its associated attachment point so as to substantially reduce the pivoting of each of the inner spokes around its associated attachment point in response to a torque applied to the inner spoke.

2. The hub of claim 1, wherein each of the outer grooves extends from one of the first plurality of spoke attachment apertures to a first termination point on the outer surface at the peripheral edge, and wherein each of the inner grooves extends from one of the second plurality of spoke attachment apertures to a second termination point on the inner surface at the peripheral edge, the first and second termination points being on a single radius $R_1$ of the hub.

3. The hub of claim 2, wherein each of the outer grooves forms an obtuse angle $\phi$ with respect to the radius $R_1$, and wherein each of the inner grooves forms an obtuse angle $-\phi$ with respect to the radius $R_1$, the angles $\phi$ and $-\phi$ being of equal magnitude and opposite direction.

4. The hub of claim 1, wherein each of the outer grooves and each of the inner grooves is of substantially uniform width.

5. A hub for a spoked wheel, wherein the hub defines a rotational axis for the wheel, comprising:

an annular peripheral portion having an outer surface, an inner surface, and a peripheral edge, wherein the inner surface and the outer surface define non-parallel planes, and wherein the inner surface forms an acute angle with respect to the rotational axis, whereby the peripheral portion is thickest along the peripheral edge, and tapers to a reduced thickness at a constant radius from the peripheral edge;

first and second pluralities of spoke attachment apertures extending through the outer and inner surfaces, the first plurality of spoke attachment apertures providing attachment points for a plurality of outer spokes on the outer surface and the second plurality of spoke attachment apertures providing attachment points for a plurality of inner spokes on the inner surface;

a plurality of outer grooves on the outer surface, each dimensioned to receive and engage a portion of the length of one of the outer spokes adjacent its associated attachment point so as to substantially reduce the pivoting of each of the outer spokes around its associated attachment point in response to a torque applied to the outer spoke, each of the outer grooves extending from one of the first plurality of spoke attachment apertures to a first termination point on the outer surface at the peripheral edge, forming a first obtuse angle with respect to a radius $R_1$ of the hub; and a plurality of inner grooves on the inner surface, each dimensioned to receive and engage a portion of the length of one of the inner spokes adjacent its associated attachment point so as to substantially reduce the pivoting of each of the inner spokes around its associated attachment point in response to a torque applied to the inner spoke, each of the inner grooves extending from one of the second plurality of spoke attachment apertures to a second termination point on the inner surface at the peripheral edge, forming a second obtuse angle with respect to a radius $R_1$ of the hub.

6. The hub of claim 5, wherein the first and second obtuse angles are of substantially equal magnitude, but opposite in direction.

* * * * *